UNITED STATES PATENT OFFICE.

HENRY A. SMELTZ, OF DUNEDIN, FLORIDA.

INSECTICIDE.

SPECIFICATION forming part of Letters Patent No. 274,523, dated March 27, 1883.

Application filed May 19, 1882. (No specimens.)

*To all whom it may concern:*

Be it known that I, HENRY A. SMELTZ, of Dunedin, in the county of Hillsborough, in the State of Florida, have invented a new and Improved Preparation for Destroying Insects on and Invigorating Orange and other Fruit Trees; and I do hereby declare that the following is a true and exact description thereof.

I take of whale-oil soap ten pounds or parts; soda mixture, five pounds or parts, (the soda mixture being composed of equal parts of bicarbonate and hyposulphite of soda;) protosulphate of iron, four pounds or parts; concentrated lye, five pounds or parts; cyanide of potassium, one-half pound or part.

Dissolve the whale-oil soap in fifteen (15) gallons of hot water. Dissolve the bicarbonate of soda and hyposulphite of soda in cold water, and add to the whale-oil soap. Add the protosulphate of iron and concentrated lye. Stir until all is dissolved, (not allowing it to boil.) When nearly cold, add the cyanide of potassium, previously dissolved in water. Stir well, and let cool and congeal.

The whale-oil soap is used mainly as a body for the mixture. Any soap or oily matter—such as shark-oil or other fish-oil and soft soap—would answer, to a great extent, the same purpose. The mixture of bicarbonate and hyposulphite of soda is used on account of its great cleansing properties, so as to remove all dirt from the pores of the bark, in order that the mixture may the more readily enter the bark. The protosulphate of iron is used both as an insecticide and a tonic to the tissue and fiber of the tree. Other forms of sulphate of iron may be used, and to a certain extent answer the purpose. The concentrated lye is used to cut the whale-oil soap, and is the most economical form of potash. Some other form of potash might be substituted and answer the purpose. The cyanide of potassium is used as the special agent in killing the insects.

What I claim as my invention, and desire to secure by Letters Patent, is—

The following compound, to wit: whale-oil soap, ten pounds or parts; soda mixture, five pounds or parts, (the soda mixture being composed of equal parts of bicarbonate and hyposulphite of soda;) protosulphate of iron, four pounds or parts; concentrated lye, five pounds or parts; cyanide of potassium, one-half pound or part.

HENRY A. SMELTZ.

Attest:
G. B. SPARKMAN,
S. B. TURMAN.